United States Patent [19]
Giles

[11] 3,923,413
[45] Dec. 2, 1975

[54] CENTERING APPARATUS

[76] Inventor: Daniel L. Giles, 455 LaFonda Ave., Santa Cruz, Calif. 95060

[22] Filed: Dec. 20, 1972

[21] Appl. No.: 316,662

Related U.S. Application Data

[63] Continuation of Ser. No. 101,847, Dec. 28, 1970, abandoned.

[52] U.S. Cl. .................. 408/72; 408/115; 408/226; 33/189
[51] Int. Cl.² .................... B23B 49/02; B23B 47/28
[58] Field of Search ......... 408/72, 75, 84, 109, 110, 408/115, 226; 33/189, 191

[56] References Cited
UNITED STATES PATENTS

| | | | |
|---|---|---|---|
| 2,764,818 | 10/1956 | Gard | 33/189 |
| 2,810,310 | 10/1957 | Saunders | 408/109 |
| 2,915,926 | 12/1959 | Woerner | 408/241 B |
| 3,365,987 | 1/1968 | Heller et al. | 408/72 R |
| 3,456,272 | 7/1969 | Wendt | 408/226 |

Primary Examiner—Francis S. Husar
Attorney, Agent, or Firm—Ancel W. Lewis, Jr.

[57] ABSTRACT

Centering apparatus for workpieces such as gun barrels having a rib includes a centering device having a base body with a pair of spaced-apart parallel legs depending from the underside of the base body and a center hole located midway between the legs. The legs engage vertical side edges of the workpiece to position the center hole precisely in the center of the workpiece. A drill bushing removably inserts into the center hole and a twist drill or a tap preferably with a flexible stem is guided by the drill bushing precisely vertically into the workpiece independently of any inclined orientation of the power drill.

3 Claims, 6 Drawing Figures

U.S. Patent   Dec. 2, 1975   3,923,413
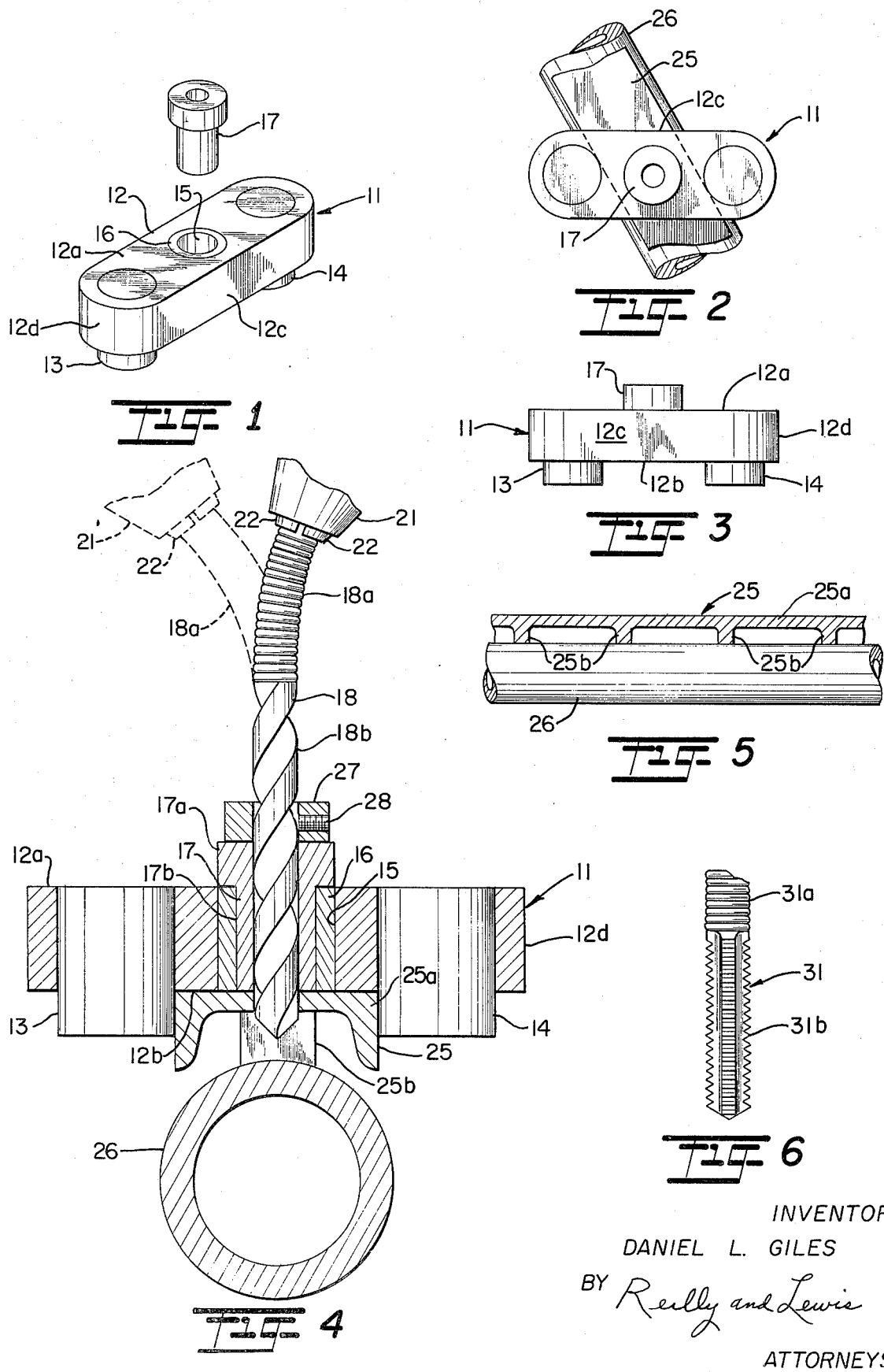

CENTERING APPARATUS

This application is a continuation of application Ser. No. 101,847, filed Dec. 28, 1970, and now abandoned.

This invention relates to improvements in centering apparatus and more particularly to a novel and improved centering apparatus which is specifically suitable for use in drilling holes precisely in the center of a workpiece and is particularly suitable for use in installing gun sights in a rapid and highly accurate manner.

A high degree of care is required for centering a hole precisely between two vertical side edges and this is particularly true in positioning a gun sight precisely in the center of the gun barrel rib to make it an accurate weapon. The present practices relating to the installation of gun sights are somewhat cumbersome and result in considerable time-consuming expense. These practices involve the tedious measurement to locate the center of the barrel and clamping of the gun barrel in a proper relation to a vertical drill press to insure that a precise vertical hole is achieved. Gun jigs have heretofore been provided for locating and holding a gun barrel relative to a drill bushing but these have a variety of mechanical adjustments and are somewhat bulky and cumbersome. Previous practices, however, to not lend themselves to the use of hand-held jigs or hand-held power drills thereby making the equipment associated with such drilling relatively expensive.

Accordingly, it is an object of this invention to provide a simple, versatile and relatively inexpensive centering apparatus suitable for being held in place by hand for use in drilling and tapping or reaming centered holes with a high degree of accuracy.

Another object of this invention is to provide a novel and improved centering apparatus which can be held in place with one hand and drilled and tapped or reamed using a conventional hand-held power drill with the other hand in a fast and highly accurate manner.

It is another object of the present invention to provide a novel and improved centering apparatus which is particularly suitable for use in installing a gun sight capable of use in the drilling and tapping of a variety of different hole sizes and on a variety of different gun barrel rib sizes.

In accordance with the present invention in a preferred embodiment thereof there is provided a centering device adapted to be hand-held on the workpiece such as a gun barrel rib inclusive of a base body and a pair of spaced-apart lega depending from the undersurface of the base body to bear against opposite vertical sides of the rib so that a center hole in the base body is precisely midway between the legs. A drill bushing of a preselected bore size releasably inserts into the center hole. A twist drill of a selected size corresponding with that of the drill bushing size, preferably mounted in a hand-held power drill, has a flexible stem so that the stem flexes to permit the power drill to be out of alignment while the drill bushing supported in the center hole retains the drill in a precise vertical position.

Other objects, advantages and capabilities of the present invention will be more readily appreciated and understood from a detailed description when taken together with the accompanying drawings, in which:

FIG. 1 is a perspective view of a novel centering device with a drill bushing shown as in a removed position above the center hole;

FIG. 2 is a top plan view of the centering device and drill bushing shown assembled together and in an operable position seated on top of a gun barrel rib for drilling and tapping or reaming of the rib;

FIG. 3 is a side elevational view of the assembled centering device and drill bushing shown in position in the center hole;

FIG. 4 is an enlarged vertical sectional view showing the centering device in place on the gun barrel rib with the drill tool mounted on a power drill;

FIG. 5 is a fragmentary side elevation view of the gun barrel rib and barrel; and FIG. 6 is a side elevation view of a tap tool having a flexible stem.

Referring now to the drawings, the centering apparatus shown includes a hand-held centering device generally designated 11 which comprises a base plate or base body 12 having a flat upper surface 12a, a flat bottom surface 12b parallel to upper surface 12a, flat side surfaces 12c parallel to one another, and rounded end portions 12d. The base 12 has a pair of spaced-apart legs 13 and 14 extending downwardly from the bottom surface thereof. These legs are generally cylindrical in shape and are of an identical size and shape. In the embodiment shown, the base body may be an integral unit formed as by molding and made of softer metal such as aluminum. The legs are generally cylindrical and made of a harder metal such as steel with the legs being sized to press-fit into holes extending vertically through the base body and the legs extend the full height of the base and project below the bottom surface thereof. The base body is formed with a vertical center hole 15 drilled or otherwise formed therein located on a longitudinal center line passing through both centers of the legs and precisely midway between the centers of the legs, locating the periphery of the legs an equally spaced distance from the periphery of the center hole 15. The center hole 15 is lined with a hollow, cylindrical, headless center hole bushing 16 having an internal diameter of a size adapted to receive conventional slip renewable drill bushings. Bushing 16 is made of a harder metal such as steel and is sized to press-fit into the center hole 15.

A conventional drill bushing 17 removably inserts into the lined center hole. The drill bushing shown and preferred is a slip renewable type bushing having a lower portion 17b sized to insert into the center hole bushing in a close fitting relationship and having a flanged upper head portion 17a which seats on the top of the center hole bushing 16. The drill bushings 17 come in sets having various hole or internal bore sizes according to the size of the drill or tap being used, making the centering device 11 suitable for use in drilling, tapping or reaming a variety of different hole sizes.

For the drilling of the hole there is provided a novel twist drill tool 18 having an upper flexible stem portion 18a and a lower conventional rigid drill body portion 18b. The upper stem portion 18a is shown as being made of a coil spring or other flexible structure to allow the power drill to be moved out of a vertical alignment without affecting the vertical position of the drill body portion 18b.

In the use of the above described centering apparatus for installing a gun sight in a gun barrel rib, for example, the upper end of the flexible stem 18a is clamped in a conventional hand-held electric power drill, an end portion of which is represented at 21 having a set of clamping jaws 22, usually three jaws being provided. The drill bushing is of a selected size corresponding with the size of the drill required and is positioned in the lined center hole as best seen in FIGS. 3 and 4. Using the thumb and forefinger of one hand, the base body 12 is seated on top of the gun barrel rib represented at 25 of a gun barrel represented at 26. The typical gun barrel rib includes an upper generally square or rectangular section 25a and has a series of spacedapart lower web sections 25b affixed to the top surface of the barrel 26. The legs depend along each side thereof and the base body is moved along the rib to the desired longitudinal position and rotated or turned about its center so that the legs firmly engage the opposite vertical sides of the gun barrel sight rib 25. The lower end of the drill tool 18 is inserted into the drill bushing and the hole is drilled using the other hand to grip the power tool 21. The hole is drilled in the rectangular section 25a and normally between the web section 25b. As represented in dashed and full lines in FIG. 4, the flexible stem portion 18a permits the drill to be moved out of alignment with the drill bushing without affecting the drilling of the hole as represented in full lines and in dashed lines at 21'. The depth of the hole is preferably preset by using a removable collar 27 affixed to the drill body 18b at a preselected position along the drill body by a set screw 28 so that the collar will engage the top of the bushing 17, after the drill extends to a preselected depth through the rectangular rib section 25a so as to avoid drilling into the gun barrel, as best seen in FIG. 4. After the hole has been drilled then a conventional tap or reamer is inserted into the bushing 17 and the hole is tapped or reamed so that the gun sight will then thread or press into the tapped hole so formed. For those applications where the tap or reamer is turned by a machine, and not by hand, it is noted that a novel tap tool 31 or a reamer tool having a similar flexible stem may be used as shown in FIG. 6 having an upper flexible stem 31a and a lower rigid tap body 31b which again allows for misalignment of the drill motor.

While the above described centering apparatus has been found to be particularly effective for drilling and tapping and reaming gun sight ribs, it is understood that this is intended as an example only and that the above described apparatus may be employed for drilling and/or tapping or reaming a number of workpieces having similar centering requirements.

Although the present invention has been described with a certain degree of particularity, it is understood that the present disclosure has been made by way of example and that changes in details of structure may be made without departing from the spirit thereof.

What is claimed is:

1. A hand-held gun barrel rib centering device for use in installing sights on a gun barrel rib comprising:
    a base body of unitary construction having a flat bottom seating face adapted to seat on top of the gun barrel rib, said base body being sized to be held with one hand in an operative centered position on the gun barrel rib without added clamping means, said base body having a vertical hole passing vertically therethrough and arranged normal to the bottom seating face to receive and provide a guide for a tool adapted to drill, tap or ream;
    two rib-engaging, hole-centering legs made as an integral part of the base body, said legs being located an equal distance on opposite sides of the center of the vertical hole extending downwardly from the bottom seating face in a parallel relation with said vertical hole, said legs having a circular transverse cross section of a corresponding dimension whereby when the base body and legs are rotated about the center of the vertical hole with the bottom seating face seated on the gun barrel rib and said legs engage the sides of the gun barrel rib, the vertical hole is centered between the sides of the gun barrel rib to center the tool relative to sides of the gun barrel rib, said base body being made of a soft metal and having a center bushing of a hard metal lining the vertical hole and press-fitted therein against the inside surfaces of the base body, said legs being formed by a solid cylindrical member made of a hard metal and press-fitted into vertical apertures adjacent the ends of the base body.

2. A hand-held gun barrel rib centering device for use in installing sights on a gun barrel rib comprising:
    a base body of unitary construction having a flat bottom seating face adapted to seat on top of the gun barrel rib, said base body being sized to be held with one hand in an operative centered position on the gun barrel rib without added clamping means, said base body having a vertical hole passing vertically therethrough and arranged normal to the bottom seating face to receive and provide a guide for a tool adapted to drill, tap or ream;
    two rib-engaging, hole-centering legs made as an integral part of the base body, said legs being located an equal distance on opposite sides of the center of the vertical hole extending downwardly from the bottom seating face in a parallel relation with said vertical hole, said legs having a circular transverse cross section of a corresponding dimension whereby when the base body and legs are rotated about the center of the vertical hole with the bottom seating face seated on the gun barrel rib and said legs engage the sides of the gun barrel rib, the vertical hole is centered between the sides of the gun barrel rib to center the tool relative to sides of the gun barrel rib; and
    a drill tool having an upper flexible stem portion adapted to be gripped by a power drill and a lower rigid drill body portion adapted to extend into and be guided by a drill bushing located in said vertical hole for drilling a vertical hole in a gun barrel rib independently of the angular position of the power drill.

3. A hand-held gun barrel rib centering device for use in installing sights on a gun barrel rib comprising:
    a base body of unitary construction having a flat bottom seating face adapted to seat on top of the gun barrel rib, said base body being sized to be held with one hand in an operative centered position on the gun barrel rib without added clamping means, said base body having a vertical hole passing vertically therethrough and arranged normal to the bottom seating face to receive and provide a guide for a tool adapted to drill, tap or ream;
    two rib-engaging, hole-centering legs made as an integral part of the base body, said legs being located an equal distance on opposite sides of the center of the vertical hole extending downwardly from the bottom seating face in a parallel relation with said vertical hole, said legs having a circular transverse cross section of a corresponding dimension whereby when the base body and legs are rotated about the center of the vertical hole with the bottom seating face seated on the gun barrel rib and said legs engage the sides of the gun barrel rib, the vertical hole is centered between the sides of the gun barrel rib to center the tool relative to sides of the gun barrel rib; and a tap tool having an upper flexible stem portion adapted to be gripped by a rotary tool and a lower rigid tap body portion extending into and guided by a drill bushing in said vertical hole for tapping a vertical hole in said gun sight rib independently of the angular position of the rotary tool.

* * * * *